(12) United States Patent
Seki

(10) Patent No.: US 11,632,201 B2
(45) Date of Patent: Apr. 18, 2023

(54) DEVICE AND METHOD FOR FRONTHAUL TRANSMISSION, AND DEVICE AND METHOD FOR FRONTHAUL RECEPTION

(71) Applicant: Panasonic Corporation, Osaka (JP)

(72) Inventor: Yuta Seki, Kanagawa (JP)

(73) Assignee: Panasonic Holdings Corporation, Osaka (JP)

(*) Notice: Subject to any disclaimer, the term of this patent is extended or adjusted under 35 U.S.C. 154(b) by 0 days.

(21) Appl. No.: 17/154,845

(22) Filed: Jan. 21, 2021

(65) Prior Publication Data
US 2021/0242981 A1 Aug. 5, 2021

(30) Foreign Application Priority Data

Jan. 31, 2020 (JP) .............................. JP2020-014842

(51) Int. Cl.
*H04L 5/00* (2006.01)
*H04L 45/74* (2022.01)

(52) U.S. Cl.
CPC ............ *H04L 5/0003* (2013.01); *H04L 45/74* (2013.01)

(58) Field of Classification Search
CPC .............................. H04L 5/0003; H04L 45/74
See application file for complete search history.

(56) References Cited

U.S. PATENT DOCUMENTS

| 2014/0334417 | A1 | 11/2014 | Aminaka et al. |
| 2021/0105084 | A1* | 4/2021 | Gulati ................... H04L 1/0017 |
| 2021/0120531 | A1* | 4/2021 | Jeon ...................... H04B 7/0691 |
| 2021/0136788 | A1* | 5/2021 | Lim ................... H04W 72/1205 |

FOREIGN PATENT DOCUMENTS

| JP | 2012-186521 A | 9/2012 |
| JP | 2018-170805 A | 11/2018 |

OTHER PUBLICATIONS

G. Otero Pérez, D. Larrabeiti López and J. A. Hernández, "5G New Radio Fronthaul Network Design for eCPRI-IEEE 802.1CM and Extreme Latency Percentiles," in IEEE Access, vol. 7, pp. 82218-82230, 2019, doi: 10.1109/ACCESS.2019.2923020 (Jun. 14, 2019).*
A. Nasrallah et al., "Ultra-Low Latency (ULL) Networks: The IEEE TSN and IETF DetNet Standards and Related 5G ULL Research,"in IEEE Communications Surveys & Tutorials, vol. 21, No. 1, pp. 88-145, Firstquarter 2019, doi: 10.1109/COMST.2018.2869350 (Sep. 24, 2018).*

(Continued)

*Primary Examiner* — Jackie Zuniga Abad
(74) *Attorney, Agent, or Firm* — Seed IP Law Group LLP

(57) ABSTRACT

A transmission device includes a controller configured to apply transmission schemes to respective divisions of a signal to be transmitted to a fronthaul and a transmitter configured to transmit the signal to the fronthaul. The respective divisions include a first division and a second division, and the controller is configured to apply a transmission scheme having higher error tolerance to the first division and a transmission scheme having lower error tolerance to the second division.

12 Claims, 15 Drawing Sheets

(56) References Cited

OTHER PUBLICATIONS

Adachi, "Wireless Optical Convergence Enables Spectrum-Energy Efficient Wireless Networks," Dept. of Communications Engineering, Graduate School of Engineering Tohoku University Sendai, Japan, 2014 International Topical Meeting on Microwave Photonics (MWP) and the 2014 9th Asia-Pacific Microwave Photonics Conference (APMP), 6 pages.
CPRI Specification V7.0, "Common Public Radio Interface (CPRI); Interface Specification," Oct. 9, 2015, 128 pages.
eCPRI Specification V2.0, "Common Public Radio Interface: eCPRI Interface Specification," May 10, 2019, 109 pages.
ITU-T, "Series G: Transmission Systems and Media, Digital Systems and Networks 5G wireless fronthaul requirements in a passive optical network context," ITU-T G-series Recommendations—Supplement 66, Telecommunication Standardization Sector of ITU, Oct. 2018, 42 pages.

\* cited by examiner

FIG. 5

| INDEX | CODE TYPE | CODING RATE | MODULATION MULTILEVEL NUMBER |
|---|---|---|---|
| 0 | Reed-Solomon | 0.5 | QPSK |
| 1 | Reed-Solomon | 0.75 | QPSK |
| 2 | Reed-Solomon | 0.8 | QPSK |
| 3 | Reed-Solomon | 0.5 | 16QAM |
| 4 | Reed-Solomon | 0.75 | 16QAM |
| 5 | Reed-Solomon | 0.8 | 16QAM |
| 6 | Reed-Solomon | 0.5 | 64QAM |
| 7 | Reed-Solomon | 0.75 | 64QAM |
| ⋮ | ⋮ | ⋮ | ⋮ |
| N-1 | LDPC | 0.75 | 256QAM |
| N | LDPC | 0.8 | 256QAM |

DEVICE AND METHOD FOR FRONTHAUL TRANSMISSION, AND DEVICE AND METHOD FOR FRONTHAUL RECEPTION

BACKGROUND

1. Technical Field

The present disclosure relates to a transmission device, a reception device, and a method of communication.

2. Background Art

In a radio communication system, in order to flexibly design an area where radio communication with a user terminal (user equipment, UE) is available, a configuration can be adopted in which a radio base station is split into a master station device and a secondary station device, and the secondary station device is disposed at a different position from the master station device.

For example, a master station device connected to a core network has a baseband signal processing function of the radio base station, and at least one secondary station device is connected to the master station device. The secondary station device performs radio processing such as analog conversion and performs radio communication with the UE.

SUMMARY

Non-limiting examples of the present disclosure contribute to providing a transmission device, a reception device, and a method of communication capable of improving robustness and transmission efficiency of signals in fronthaul communication.

A transmission device according to one aspect of the present disclosure includes a controller configured to control a transmission scheme for each of a plurality of divisions corresponding to signals which are divided and are to be transmitted to a fronthaul, and a transmitter configured to transmit the signals to the fronthaul.

A reception device according to one aspect of the present disclosure includes a receiver configured to receive signals from a fronthaul, and a controller configured to control restoration processing for each of a plurality of divisions in accordance with a transmission scheme controlled for each of the plurality of divisions, the plurality of divisions corresponding to the signals which are divided.

A method of communication according to one aspect of the present disclosure includes controlling a transmission scheme for each of a plurality of divisions corresponding to signals which are divided and are to be transmitted to a fronthaul, and transmitting the signals to the fronthaul.

A method of communication according to one aspect of the present disclosure includes receiving signals from a fronthaul, and controlling restoration processing for each of a plurality of divisions in accordance with a transmission scheme controlled for each of the plurality of divisions, the plurality of divisions corresponding to the signals which are divided.

Note that these comprehensive or specific aspects may be realized by a system, an apparatus, a method, an integrated circuit, a computer program, or a recording medium, or by a combination of any of a system, an apparatus, a method, an integrated circuit, a computer program, and a recording medium.

One aspect of the present disclosure makes it possible to improve the robustness and transmission efficiency of signals in the fronthaul communication.

Further advantages and effects of one aspect of the present disclosure will be apparent from the specification and drawings. Such advantages and/or effects are provided by some exemplary embodiments and the characteristics described in the specification and drawings, respectively, but all the advantages and/or effects do not have to be provided to obtain one or more of the same characteristics.

BRIEF DESCRIPTION OF DRAWINGS

FIG. 5 is a table showing an example of a combination of a code type, a coding rate, and a modulation multilevel number according to the first exemplary embodiment;

DETAILED DESCRIPTION OF PREFERRED EMBODIMENTS

Before describing exemplary embodiments, problems in a conventional technique will be briefly described. In an existing radio communication system (for example, a radio base station), there is room for consideration regarding improvement of signal robustness (in other words, error tolerance) and transmission efficiency in fronthaul communication, which is communication between a master station device and a secondary station device.

Findings Leading to the Present Disclosure

In the existing technology (for example, Unexamined Japanese Patent Publication No. 2018-170805), the master station device may be referred to as baseband unit (BBU), and the secondary station device may be referred to as remote radio head (RRH). For a connection between the master station device and the secondary station device, for example, a wired transmitting means (or a wired interface) such as a coaxial cable, an unshielded twisted pair (UTP) cable, a shielded twisted pair (STP) cable, or an optical fiber cable is used. Such a connection between the master station device and the secondary station device may be referred to as a "fronthaul connection" or simply a "fronthaul".

In specifications regarding communication schemes of the fronthaul (FH), the master station device may be referred to as radio equipment controller (REC) or eREC, and the secondary station device may be referred to as radio equipment (RE) or eRE (eCPRI RE). For example, the Common Public Radio Interface (CPRI) Interface Specification V7.0 (2015-10-09) defines the communication scheme between REC and RE, and the Common Public Radio Interface: eCPRI Interface Specification V2.0 (2019-05-10) defines the communication scheme between eREC and eRE. The "eCPRI" is an abbreviation for "evolved common public radio interface". The "communication schemes" may be read as "transmission schemes".

In order to improve a quality of FH communication (or transmission), it can be assumed that correction processing such as erasure correction and error correction of a transmission signal is applied to the FH communication.

Figure 1:
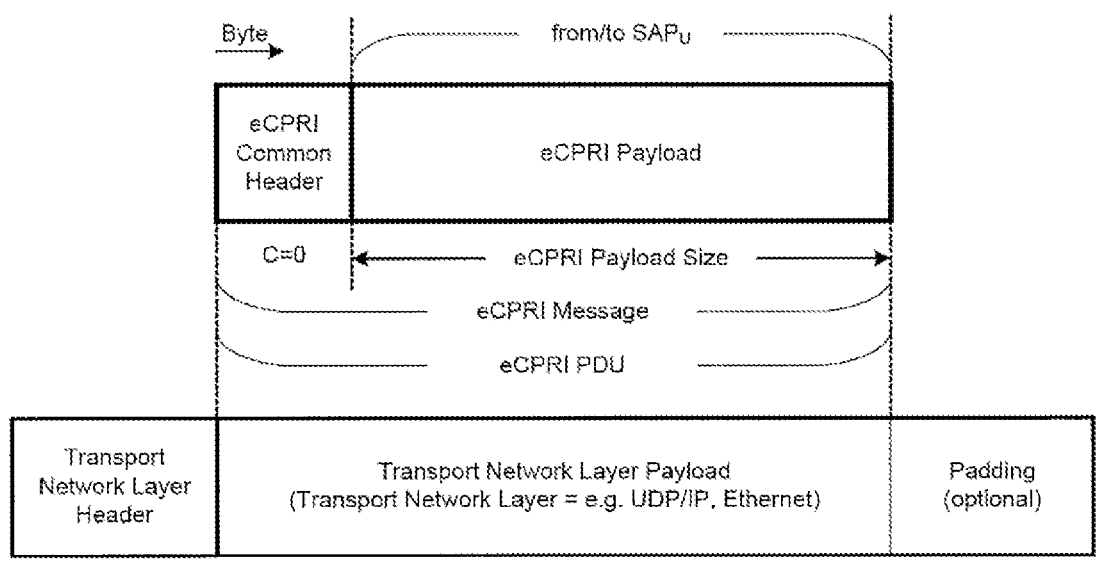
FIG. 1 shows an example of a structure of a transport network layer (TNL) signal.

Meanwhile, Common Public Radio Interface: eCPRI Interface Specification V2.0 (2019-05-10) describes that signals are transmitted in Ether packet format under the concept of Radio on Ether (RoE). FIG. 1 shows an example of a frame signal structure in the Ether packet format (which hereinafter may be abbreviated as "frame structure").

In FIG. 1, a frame signal of a transport network layer (TNL) has a header part and a payload part. The payload part includes, for example, an eCPRI signal. The eCPRI signal includes a common header (eCPRI common header) and the payload part.

As shown in FIG. 1, the eCPRI signal may be referred to as an eCPRI message or an eCPRI protocol data unit (PDU). The eCPRI signal also corresponds to a signal transmitted and received between layers via a service access point ($SAP_U$) for a user (U) plane. For example, $SAP_U$ corresponds to an access point between layers that processes a radio transmission signal in radio base station 1.

The payload part of the eCPRI signal includes, for example, a radio transmission signal (for example, a PDSCH or PDCCH signal) subjected to signal processing by the master station device or the secondary station device. The "PDSCH" is an abbreviation for "physical downlink shared channel", and the "PDCCH" is an abbreviation for "physical downlink control channel". The radio transmission signal is subjected to error correction processing (FEC: Forward Error Correction) at a transmitter side.

In the error correction subjected to the payload part of the eCPRI signal in the master station device for transmission in a radio section, even if an error occurs in the payload section of the TNL in the FH transmission section, the error can be corrected at a radio receiver side (for example, user equipment (UE) in a downlink).

Meanwhile, the header part such as a TNL header or an eCPRI common header may include, for example, information on transmission control between the master station device and the secondary station device. For example, the header part may include information on a plurality of destinations corresponding to a plurality of secondary station devices.

If an error occurs in the header part, the payload part to which the header part is added may fail to be restored on the receiver side and be discarded. The header part is therefore more important and is expected to have higher error tolerance than the payload part. In other words, the transmission signal in the FH transmission section may have different error tolerance and importance depending on a structure (or format) of the transmission signal.

When the same error correction or erasure correction is uniformly performed over the entire signal without considering the structure of the transmission signal, the FH communication may be inefficient and the quality of the FH communication may deteriorate.

For example, when the correction processing optimized for the payload part is applied to the header part, the correction processing may be insufficient for the header part. As a result, some information in the header part (for example, the destination information or the control information) may be missing.

On the contrary, when the correction processing optimized for the header part is applied to the payload part, the payload part has excessive redundancy, and the transmission efficiency of the FH may decrease.

Outline of the Present Disclosure

Based on the above findings, the following techniques will be described in the present disclosure, for example.

(1) The signal structure of the FH transmission is divided into multiple divisions (or parts), and different FH communication schemes are applied to the divisions. For example, the signal structure is divided into a first division and a second division, and different FH communication schemes are applied to the first division and the second division.

Note that the signal structure is "divided into a plurality of divisions" may be read as the signal structure is "divided or segmented into a plurality of blocks, fields, sections, or segments".

(2) The FH communication schemes applied to each division may be defined by at least one of transmission parameters such as an error correction code (code type), a coding rate, a modulation multilevel number, and an optical multiplex wavelength. The transmission parameter is an example of information that defines the FH communication scheme alone or in combination of two or more.

(3) The first division may include, for example, information set in the header part (header information) and the control information set in the header part or the payload part. Meanwhile, the second division may include, for example, information having lower error tolerance or less importance than the header information and the control information (for example, payload information). The payload information may include, for example, a signal (for example, a data signal) subjected to the radio signal processing in the master station device or the secondary station device.

(4) In a case of (3), for example, an FH communication scheme having higher error tolerance (being more robust against errors) than an FH communication scheme applied to the second division is applied to the first division.

For example, the higher the coding rate (in other words, the lower the redundancy), the higher the transmission efficiency but the lower an error correction capability tends to be. Conversely, the lower the coding rate (in other words, the higher the redundancy), the lower the transmission efficiency but the higher the error correction capability tends to be.

Further, the higher the modulation multilevel number, the higher a transmission capacity but the lower the error tolerance. The lower the modulation multilevel number, the lower the transmission capacity but the higher the error tolerance tends to be.

Regarding the optical multiplex wavelength, communication with different transmission speeds (in other words, different transmission schemes) may be assigned depending on a wavelength (lane). Thus, for example, a wavelength lane having higher error tolerance may be assigned to the first division than to the second division.

In (4), the FH communication schemes applied to the first division and the second division may be determined based on the error tolerance determined in accordance with setting of the individual transmission parameters as described above.

Figure 2:
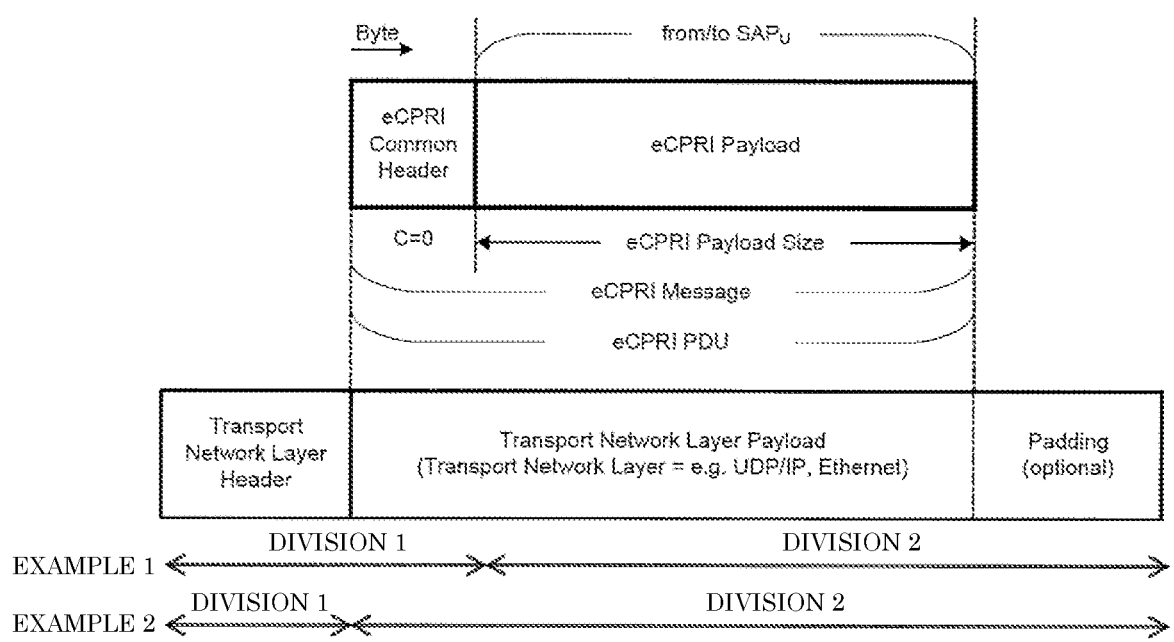
FIG. 2 is a diagram showing an example of division for the TNL signal of the present disclosure.

FIG. 2 shows an example of the divisions. FIG. 2 shows an example of defining (or setting) two divisions for the frame structure illustrated in FIG. 1.

In a first example (example 1), the header part of the TNL and the common header part of the eCPRI signal belong to the first division (division 1). The remaining payload part (the payload part of the TNL and the payload part of the eCPRI) belongs to the second division (division 2). When an optional padding part is added to the payload part, the padding part may belong to division 2 in addition to the payload part.

In a second example (example 2), the header part of the TNL belongs to division 1, and the payload part of the TNL including the common header part of the eCPRI belongs to division 2. In example 2, when the padding part is added to the payload part, the padding part may belong to division 2 in addition to the payload part as in example 1.

In example 2, of the two header parts, the common header part of the eCPRI included in the payload part of a higher layer by encapsulation belongs to division 2. In this way, all of the plurality of header parts does not have to belong to one division 1, and a part of the plurality of header parts may belong to division 2. In this case, the frame structure can be divided without using configuration information of the payload of the TNL.

The examples of division are not limited to examples 1 and 2 shown in FIG. 2. For example, three or more divisions may be defined for the structure of the signal transmitted through the FH. Further, the "header part" may be read as another term such as "header field" or "header area", and may be simply referred to as "header". Similarly, the "payload part" may be read as another term such as "payload field" or "payload area", and may be simply referred to as "payload".

Hereinafter, exemplary embodiments will be described with reference to the drawings. Note that a more detailed description than needed may be omitted. For example, a detailed description of well-known matters and a redundant description of substantially the same configuration may be omitted.

This is to avoid an unnecessarily wordy description and to facilitate understanding of those skilled in the art.

Note that the attached drawings and the following description are provided for those skilled in the art to fully understand the present disclosure, and are not intended to limit the subject matter as described in the appended claims.

First Exemplary Embodiment

Figure 3:
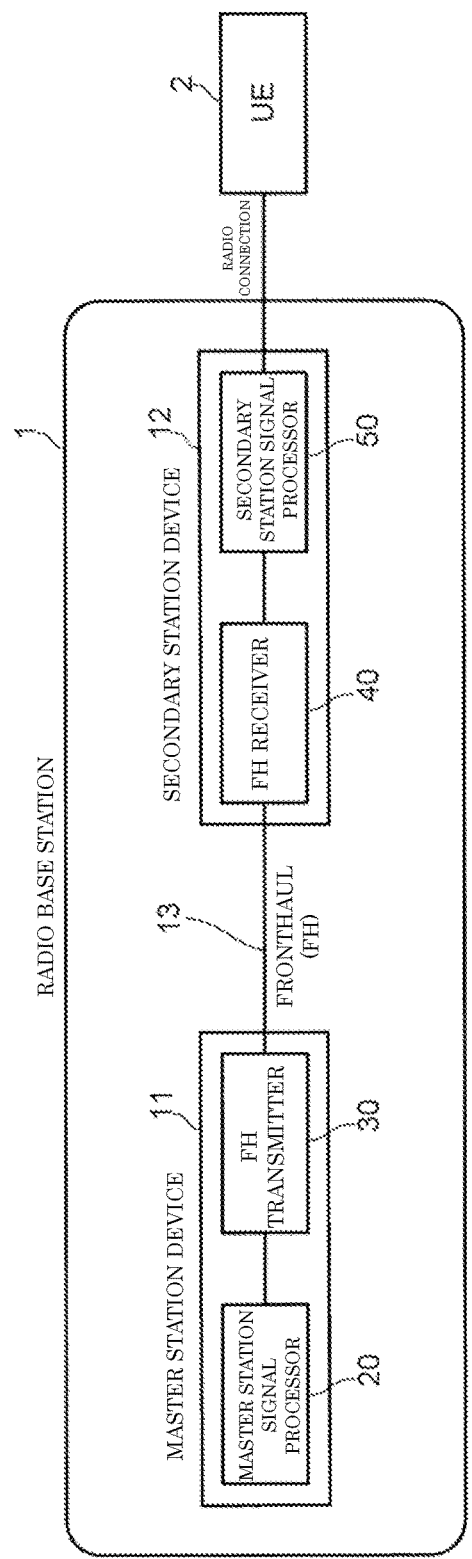
FIG. 3 is a diagram showing an example of a configuration (downlink, DL) of a radio communication system according to a first exemplary embodiment.

FIG. 3 is a diagram showing an example of a configuration of a radio communication system according to a first exemplary embodiment. As illustrated in FIG. 3, the radio communication system includes, for example, radio base station 1 and UE 2, which is an example of a terminal device. The number of radio base stations 1 and the number of UE 2 may be more than or equal to two.

Figure 7:
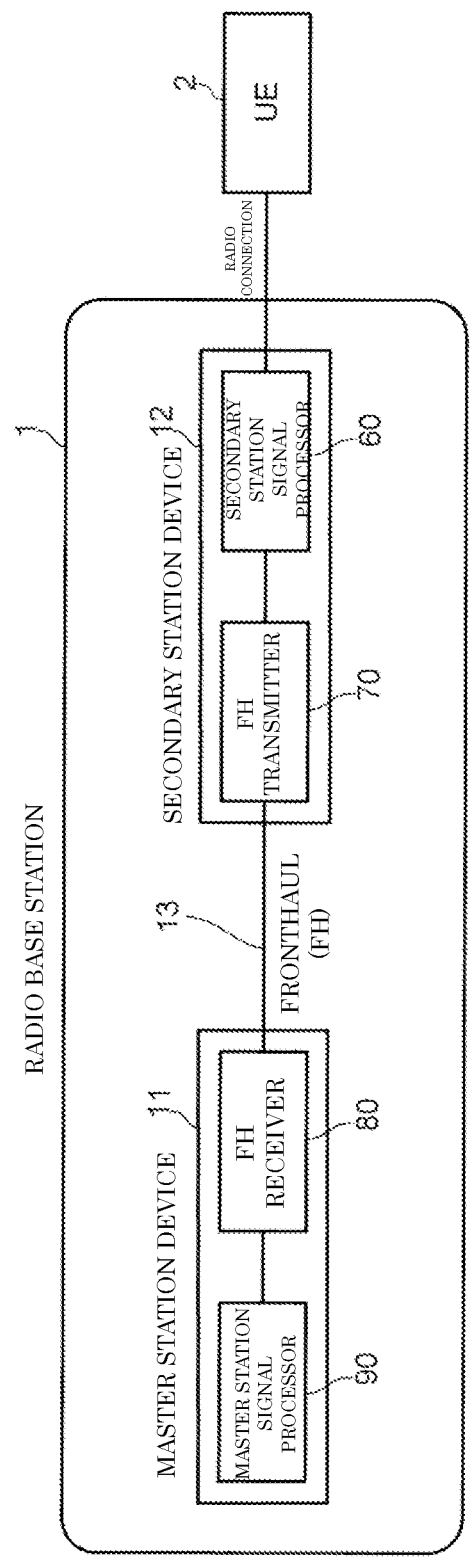
FIG. 7 is a diagram showing an example of a configuration of a radio communication system according to a second exemplary embodiment.
Figure 8A:
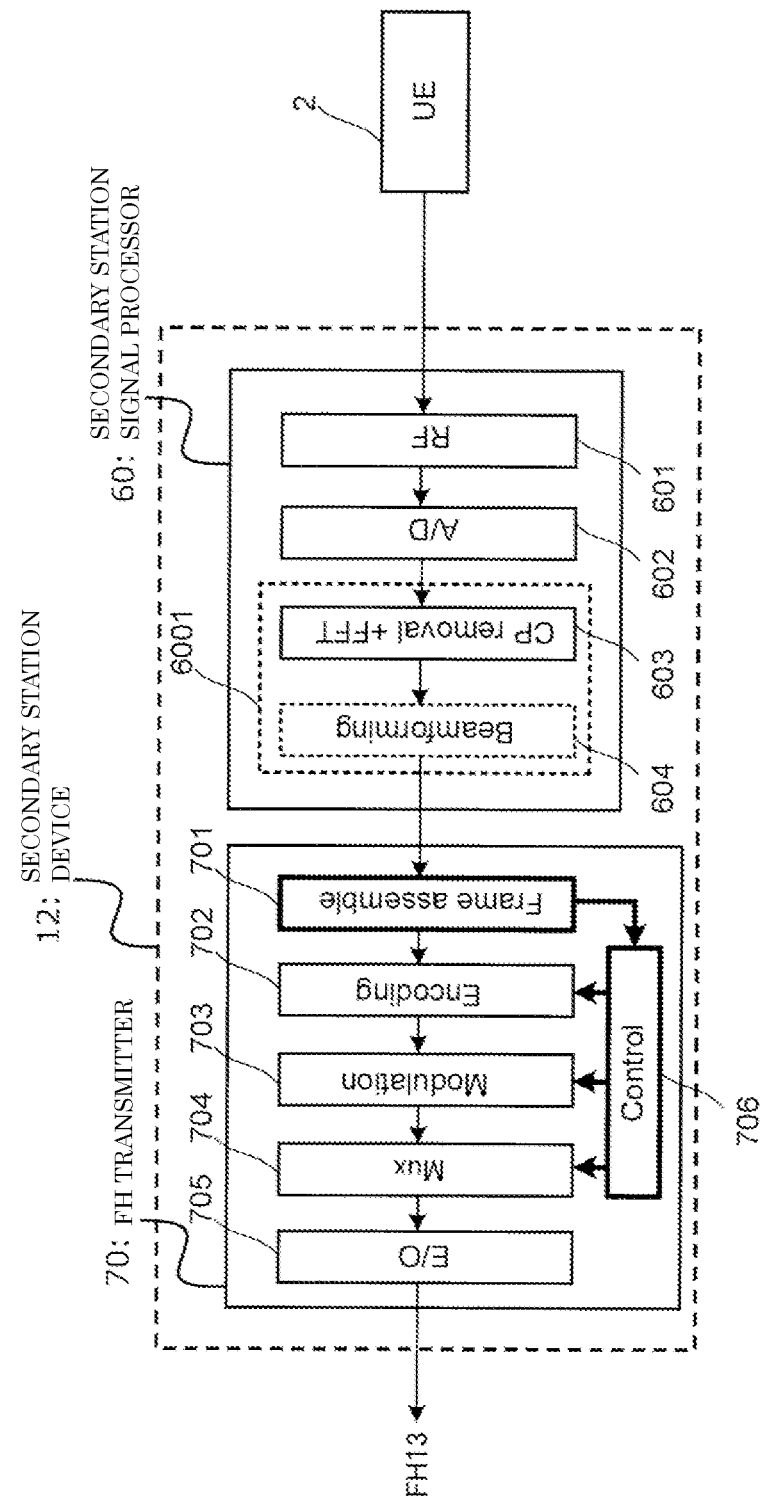
FIG. 8A is a block diagram showing an example of a configuration (uplink, UL) of a secondary station device according to the second exemplary embodiment.
Figure 8B:
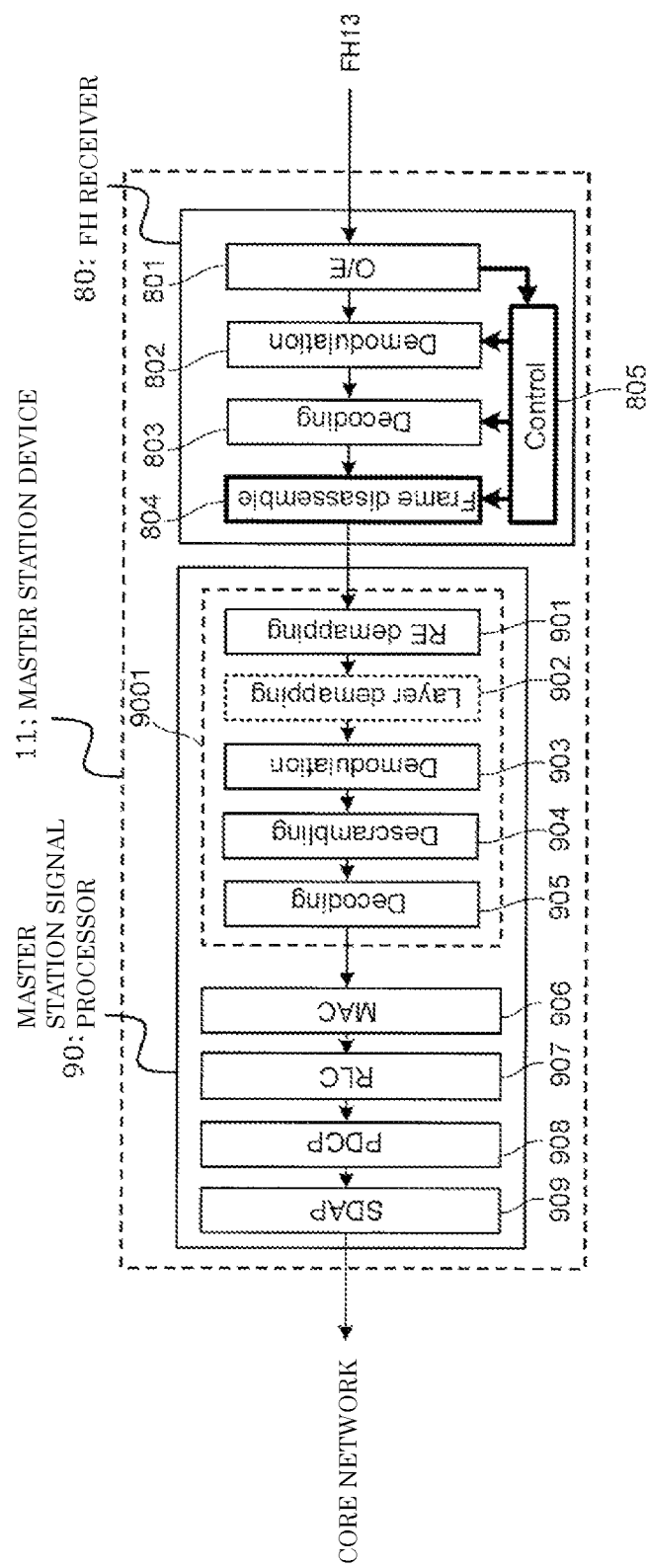
FIG. 8B is a block diagram showing an example of a configuration (UL) of a master station device according to the second exemplary embodiment.

UE 2 connects and performs radio communication with radio base station 1. Radio communication between UE 2 and radio base station 1 includes at least one of uplink (UL) communication or downlink (DL) communication. Hereinafter, an example of a configuration and operation focusing on the DL of radio base station 1 will be described. An example focusing on the UL will be described later in a second exemplary embodiment (FIGS. 7, 8A, and 8B).

Radio base station 1 includes, for example, master station device 11 and secondary station device 12 that are interconnected by FH 13. Master station device 11 may be referred to as, for example, BBU, centralized baseband unit (CBBU), REC, or central unit (CU). Secondary station device 12 may be referred to as, for example, RRH, RE, or distributed unit (DU). Note that one master station device 11 can be connected to two or more secondary station devices 12. In addition, one secondary station device 12 can be connected to two or more UEs 2.

By way of example, a wired transmitting means (or the wired interface) such as a UTP cable, an STP cable, or an optical fiber cable may be applied to FH 13. Wired interfaces may be interfaces that comply with standards or technologies such as common public radio interface (CPRI), evolved CPRI (eCPRI), open base station architecture initiative (OBSAI), radio over Ethernet (RoE), and radio over fiber (RoF). "Ethernet" is a registered trademark.

<Master Station Device 11>

Figure 4A:
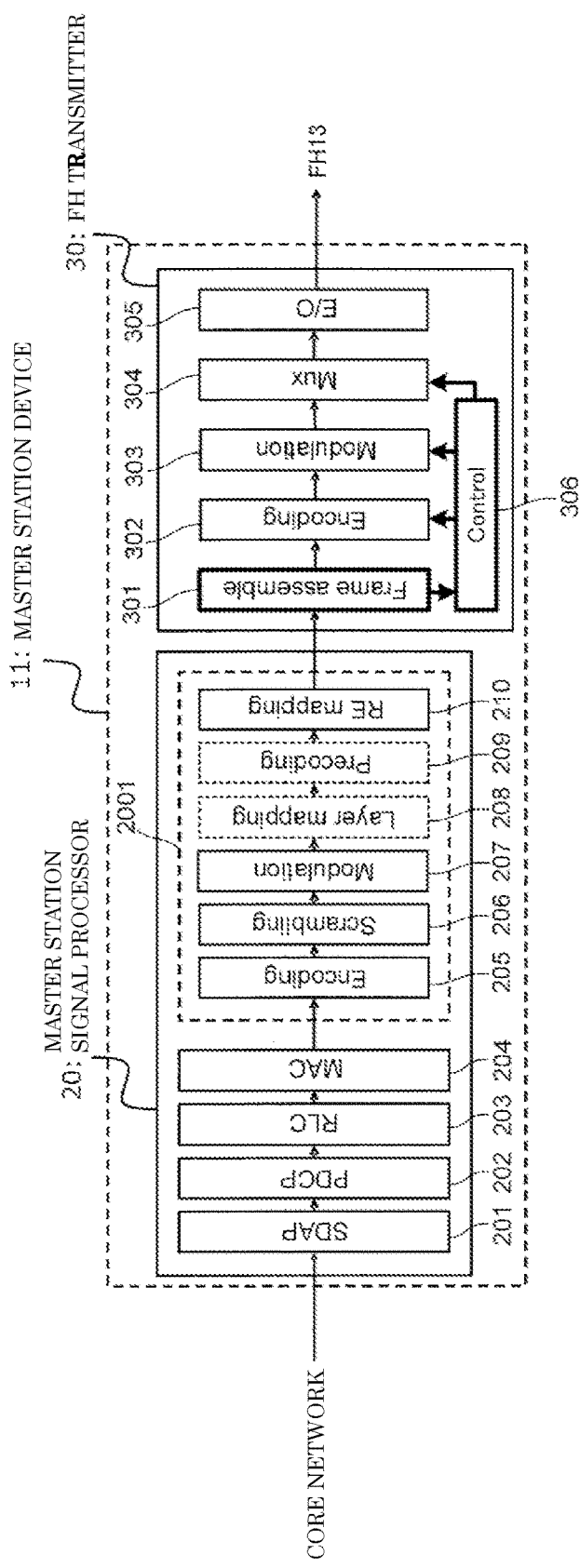
FIG. 4A is a block diagram showing an example of a configuration (DL) of a master station device according to the first exemplary embodiment.

As illustrated in FIG. 3, master station device 11 includes, for example, master station signal processor 20 and FH transmitter 30, and secondary station device 12 includes FH receiver 40 and secondary station signal processor 50. FIG. 4A shows an example of a configuration (DL) of master station signal processor 20 and FH transmitter 30, and FIG. 4B shows an example of a configuration (DL) of FH receiver 40 and secondary station signal processor 50.

(Master Station Signal Processor 20)

As illustrated in FIG. 4A, master station signal processor 20 includes, for example, service data adaptation protocol (SDAP) unit 201, packet data convergence protocol (PDCP) unit 202, and radio link control (RLC) unit 203, and MAC unit 204. Further, master station signal processor 20 includes, for example, encoder 205, scrambling unit 206, modulator 207, layer mapping unit 208, precoder 209, and resource element (RE) mapping unit 210.

Figure 4B:
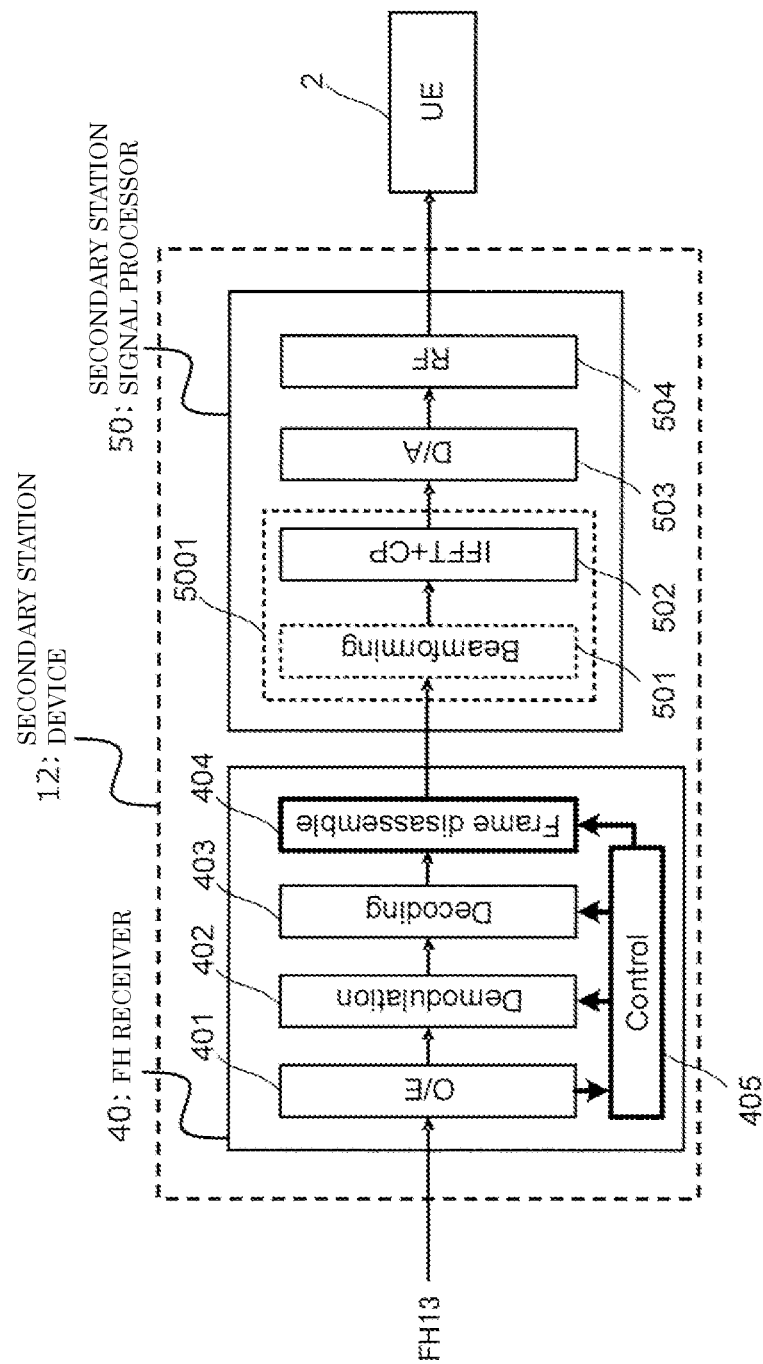
FIG. 4B is a block diagram showing an example of a configuration (DL) of a secondary station device according to the first exemplary embodiment.

These functional units 201 to 210, together with functional units 501 and 502 in secondary station signal processor 50 described later with reference to FIG. 4B, are a non-limiting example of a plurality of base station functional units provided in radio base station 1. Encoder 205, scrambling unit 206, modulator 207, layer mapping unit 208, precoder 209, RE mapping unit 210, for example, form higher physical layer (High-PHY) block 2001.

For example, a signal (for example, user data) transmitted from a higher-level core network (for example, EPC or 5GC) is input to SDAP 201. "EPC" is an abbreviation for "evolved packet core", and 5GC is an abbreviation for "fifth generation (5G) core network". The term 5G stands for fifth generation radio access technology (RAT) and is sometimes referred to as new radio (NR). Further, 5GC is sometimes referred to as next generation core network (NGC).

For example, SDAP unit 201 maps a QoS flow and a radio bearer, adds an SDAP header to a signal (for example, packet) sent from the higher-level core network, and outputs the signal to PDCP unit 202.

PDCP unit 202 performs processing such as encryption of the user data and header compression on the output of SDAP unit 201, and outputs a PDCP protocol data unit (PDU) to RLC unit 203.

RLC unit 203 performs processing such as error detection and retransmission control by an automatic repeat request (ARQ) on the output of PDCP unit 202, and outputs an RLC PDU.

MAC unit 204, for example, controls retransmission by a hybrid automatic repeat request (HARQ), determines UE 2 to allocate communication opportunities by scheduling, determines a modulation and coding scheme (MCS) in radio transmission, generates a MAC PDU from the RLC PDU, and outputs a transport block. A channel quality indicator (CQI) fed back from UE 2 may be used to determine the MCS.

MAC unit 204 outputs control information such as information on the determined MCS and resources used for the radio transmission (for example, resource element (RE) information) to High-PHY block 2001 after MAC unit 204.

In High-PHY block 2001, encoder 205 adds a cyclic redundancy check (CRC) code to the transport block input from MAC unit 204, for example, and splits the transport block into code blocks. Further, encoder 205 performs, for example, encoding of the code block and rate matching corresponding to the MCS.

Scrambling unit 206 performs scrambling processing on the output of encoder 205, for example.

Modulator 207 modulates an output of scrambling unit 206 by a modulation scheme such as quadrature phase shift keying (QPSK), 16 quadrature amplitude modulation (QAM), 64QAM, or 256QAM.

Layer mapping unit 208 maps an output of modulator 207 to a plurality of layers, for example.

Precoder 209 precodes an output of layer mapping unit 208, for example.

RE mapping unit 210 maps, for example, an output of precoder 209 to a predetermined radio resource (for example, RE). One RE is, for example, a radio resource area with one sub-carrier and one symbol. A resource block (RB) may be configured by one or a plurality of REs. The one or plurality of RBs can be referred to as other terms such as physical RB (PRB), sub-carrier group (SCG), resource element group (REG: RE group), PRB pair, and RB pair.

Layer mapping unit 208 and precoder 209, which are used for multiple-input and multiple-output (MIMO) transmission, may be omitted when the MIMO transmission is not applied.

Further, the control information for UE 2 to demodulate and decode a user data signal is multiplexed with the user data signal and transmitted from radio base station 1 to UE 2 (not shown). For example, the user data signal is transmitted by the PDSCH and the control information is transmitted by the PDCCH. The PDSCH and the PDCCH are subjected to time division multiplexing and radio communication by different orthogonal frequency division multiple access (OFDM) symbols.

(FH Transmitter 30)

Meanwhile, as illustrated in FIG. 4A, FH transmitter 30 includes, for example, frame assembler 301, encoder 302, modulator 303, multiplexer (Mux) 304, and electrooptical (E/O) converter 305, and controller 306.

An output signal of master station signal processor 20 is input to frame assembler 301. For example, frame assembler 301 generates a signal having a predetermined frame (or packet) structure from the output signal of master station signal processor 20, and outputs the signal to encoder 302.

For example, as illustrated in FIG. 2, the frame structure includes the first division (division 1) including one or the plurality of header parts and the second division (division 2) including the payload. For example, frame assembler 301 outputs information on the frame structure including the division to controller 306. The information may include, for example, information indicating positions of divisions 1 and 2 in the frame structure. Alternatively, the information may include an index indicating a frame structure selected from a plurality of predetermined frame structures.

The common header of the eCPRI includes, for example, at least one of a protocol type, a message type, or a payload size. The header part of the TNL includes, for example, an Ethernet header and a user datagram protocol (UDP) Internet protocol (IP) header. "Ethernet" is a registered trademark.

For example, controller 306 determines different FH transmission schemes for division 1 and division 2, and outputs information on the determined FH transmission schemes (for example, the transmission parameter and/or the frame structure) to encoder 302 and modulator 303. The information on the FH transmission schemes may be referred to as "FH transmission control information" or simply "control information" for convenience.

For example, encoder 302 executes a first encoding process for division 1 based on the FH transmission control information of division 1 from controller 306, and executes a second encoding process for division 2 based on the FH transmission control information of division 2 from controller 306. For example, in the first encoding process, a lower coding rate than a coding rate in the second encoding process may be used.

For example, modulator 303 executes a first modulation process for division 1 based on the FH transmission control information of division 1 from controller 306, and executes a second modulation process for division 2 based on the FH transmission control information of division 2 from controller 306. For example, in the first modulation process, modulation with a lower modulation multilevel number than in the second modulation process may be used.

FIG. 5 shows a non-limiting example of FH transmission control information (for example, the transmission parameter). FIG. 5 shows an example of combinations of the code type, the coding rate, and the modulation multilevel number in a table format. The code type is an example of information indicating a code type such as a Reed-Solomon code or a low-density parity check (LDPC) code. The "code type" is not limited to a block code, and may include a convolutional code such as a turbo code. The "modulation multilevel number" is not limited to 256 or less, and may be, for example, a multiple value of 512 or more.

For example, controller 306 may determine the FH transmission schemes (for example, an index value in FIG. 5) to be applied to divisions 1 and 2 based on the information illustrated in FIG. 5, and output the determined information to encoder 302 and modulator 303 as an example of the FH transmission control information.

The information illustrated in FIG. 5 may be stored in, for example, a storage (not shown) accessible from controller 306. The storage may be provided inside controller 306, or may be provided outside controller 306, inside master station device 11. Alternatively, the storage may be provided in, for example, an external device of master station device 11 accessible via a communication line.

For example, multiplexer 304 multiplexes outputs of modulator 303 (for example, signals corresponding to division 1 and division 2) and outputs the output to E/O converter 305. Further, multiplexer 304 multiplexes the outputs of modulator 303 and the information on the FH transmission schemes of divisions 1 and 2 output from controller 306.

For example, any of time division multiplexing (TDM), frequency division multiplexing (FDM), or code division multiplexing (CDM) may be applied as a multiplexing scheme of the signal for each division. Alternatively, the signal for each division may be subjected to wavelength division multiplexing (WDM) in E/O converter 305, for example. In other words, the signal for each division may be multiplexed by any of TDM, FDM, CDM, or WDM and transmitted to FH 13 in master station device 11.

For example, E/O converter 305 electrooptically converts the output of multiplexer 304 and transmits an optical signal obtained by the conversion to FH 13.

Frame assembler 301, encoder 302, modulator 303, multiplexer 304, and E/O converter 305 form a non-limiting example of a transmitter that transmits the signal to FH 13.

The FH transmission control information of division 1 and division 2 is not multiplexed with the output of modulator 303, for example, and may be notified to secondary station device 12 (for example, controller 405 of FH receiver 40 described later in FIG. 4B). For example, a channel for communication between controller 306 and controller 405 may be individually set in FH 13, or may be set in a communication path different from FH 13.

Further, a function of controller 306 only has to be provided in master station device 11, and does not have to be provided in a functional block different from FH transmitter 30 in master station device 11.

<Secondary Station Device 12>

Next, an example of a configuration (DL) of secondary station device 12 will be described with reference to FIG. 4B.

(FH Receiver 40)

As illustrated in FIG. 4B, in secondary station device 12, FH receiver 40 includes, for example, optoelectronic (O/E) converter 401, demodulator 402, decoder 403, frame disassembler 404, and controller 405.

O/E converter 401 receives, for example, the optical signal transmitted through FH 13 and converts the optical signal into an electric signal. Further, O/E converter 401 separates from the electric signal, for example, a frame signal and FH transmission control information multiplexed with the frame signal. The frame signal is output to, for example, demodulator 402, and the FH transmission control information is output to, for example, controller 405.

Controller 405 identifies divisions 1 and 2 in the frame signal (frame structure) to be demodulated and decoded, for example, based on the FH transmission control information. Further, controller 405 outputs information indicating identified divisions 1 and 2 to demodulator 402, decoder 403, and frame disassembler 404, and outputs (or sets or applies) the transmission parameters corresponding to divisions 1 and 2 to demodulator 402 and decoder 403. Note that "identify" may be read as another term such as "distinguish", "discriminate", or "detect".

Setting the transmission parameters corresponding to division 1 and division 2 may be regarded as, for example, applying restoration processing corresponding to the different FH transmission schemes applied to division 1 and division 2 (at the transmitter side) to a reception signal from FH 13. This point also applies to second to fourth exemplary embodiments described later.

For example, demodulator 402 demodulates the signals corresponding to divisions 1 and 2 based on the information input from controller 405, and outputs the signals to decoder 403.

For example, decoder 403 decodes the signals corresponding to divisions 1 and 2 based on the information input from controller 405, and outputs the signals to frame disassembler 404.

Frame disassembler 404 performs header processing such as detecting and removing (decapsulating) the header part of the frame signal which is a demodulated signal from demodulator 402, for example. In the header processing, for example, frame disassembler 404 confirms the destination of the demodulated frame signal, and if the destination is a frame signal addressed to secondary station device 12 itself, frame disassembler 404 outputs the payload part from which the header part is removed to secondary station signal processor 50. If the destination of the demodulated frame signal is addressed to another secondary station device 12, frame disassembler 404 does not output the frame signal to secondary station signal processor 50, and may discard the frame signal, for example.

O/E converter 401, demodulator 402, decoder 403, and frame disassembler 404 form a non-limiting example of a receiver that receives the signal from FH 13.

(Secondary Station Signal Processor 50)

As illustrated in FIG. 4B, secondary station signal processor 50 includes, for example, beamforming unit 501, inverse fast Fourier transform (IFFT)+cyclic prefix (CP) unit 502, and digital to analog (D/A) converter 503, and radio frequency (RF) unit 504.

Beamforming unit 501 and IFFT+CP unit 502 form, for example, lower physical layer (Low-PHY) block 5001.

Beamforming unit 501 performs beam forming processing on the output of FH receiver 40, for example. Beamforming unit 501 may be omitted when beamforming is not performed in secondary station device 12.

IFFT+CP unit 502 inserts IFFT and CP into an output of beamforming unit 501, for example.

D/A converter 503 converts, for example, an output of IFFT+CP unit 502 from a digital signal to an analog signal.

For example, RF unit 504 performs transmission RF processing such as up-conversion processing to a radio frequency and amplification processing on the output of D/A converter 503. A radio signal generated by the transmission RF processing is radiated into a space (for example, transmitted to UE 2) via an antenna (not shown) provided in RF unit 504, for example.

Operation Example

Next, an example of operations of frame assembler 301 in FH transmitter 30 of master station device 11 and frame disassembler 404 in FH receiver 40 of secondary station device 12 (frame assembly processing and frame disassembly processing) will be described for each item (for each of FIGS. 6A and 6B).

(Frame Assembly Processing)

Figure 6A:
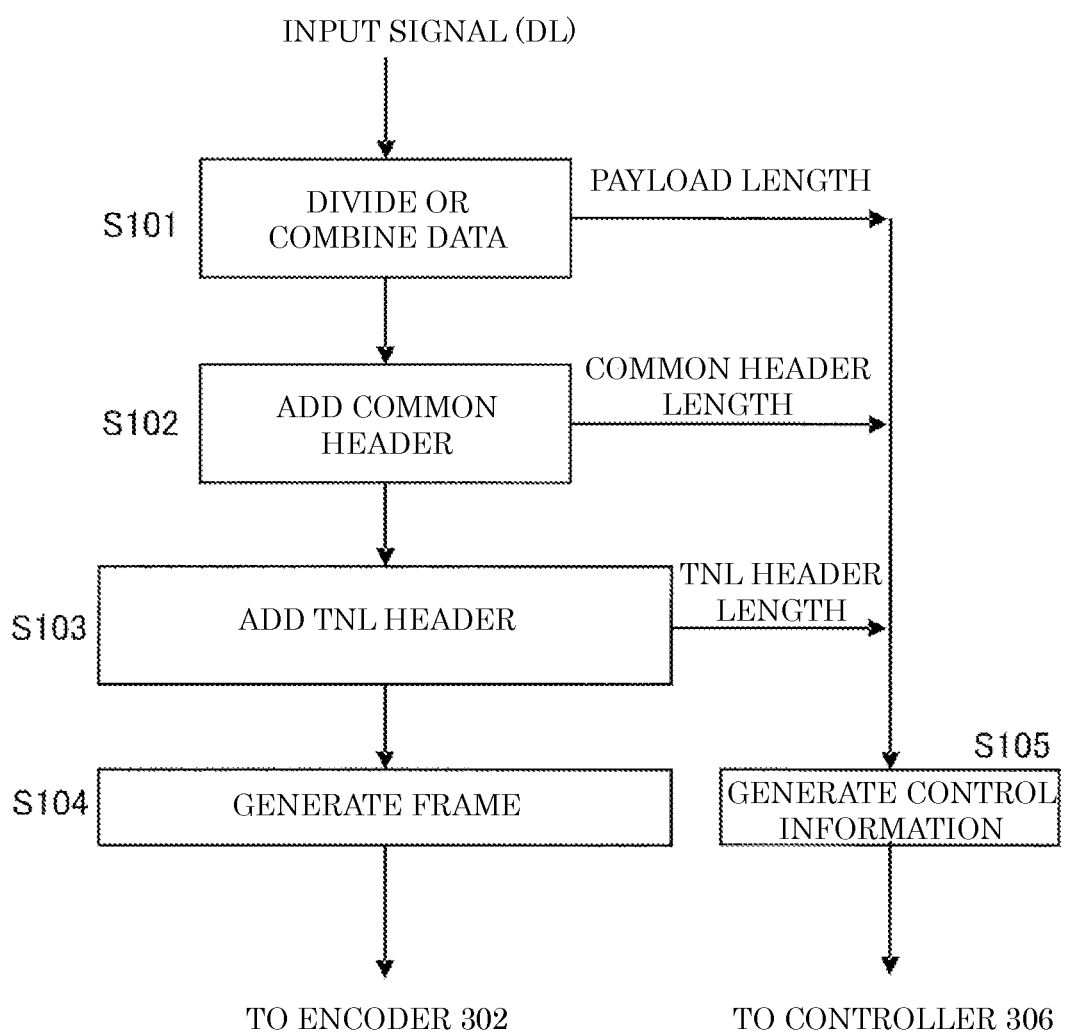
FIG. 6A is a diagram showing an example of an operation of a frame assembler according to the first exemplary embodiment.

FIG. 6A is a diagram showing an example of the operation of frame assembler 301 (frame assembly processing). As illustrated in FIG. 6A, frame assembler 301 divides or combines, for example, a signal (DL signal) input from master station signal processor 20 in accordance with a signal size (for example, payload length) of the frame structure to be generated (S101).

Then, frame assembler 301 adds the common header part (first header) of the eCPRI to the payload part (S102), and further adds the header part (second header) of the TNL which is a higher layer (S103). By adding the second header, the first header and the payload part are encapsulated by the signal of the higher layer corresponding to the second header, and the frame signal of the higher layer is generated (S104).

Meanwhile, frame assembler 301 generates information on the frame structure to be assembled (for example, the payload length, a common header length, a TNL header length, and the division) in the above processing of S101 to S103, and outputs the information to controller 306 (S105).

Controller 306 can identify signals corresponding to division 1 and division 2 in the frame signal based on the information on the frame structure, and can determine the FH transmission schemes to be applied to the identified signals.

(Frame Disassembly Processing)

Next, an example of the operation (frame disassembly processing) of frame disassembler 404 will be described with reference to FIG. 6B. The frame disassembly processing may be regarded as a process corresponding to a reverse of the frame assembly processing described above.

Figure 6B:
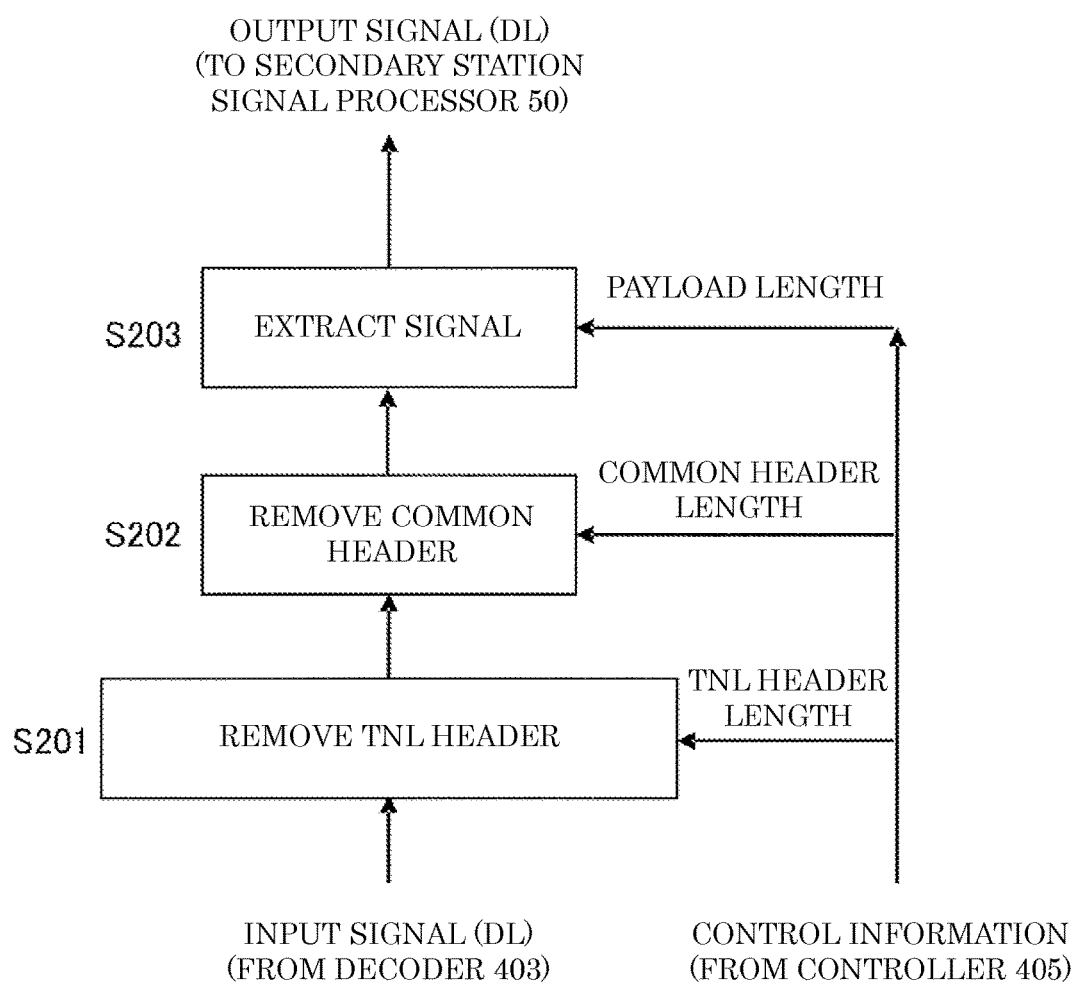
FIG. 6B is a diagram showing an example of an operation of a frame disassembler according to the first exemplary embodiment.

For example, as shown in FIG. 6B, frame disassembler 404 removes the second header in the output signal of decoder 403 based on the input information from controller 405 (for example, the FH transmission control information including information on the frame structure) (S201). The second header corresponds to, for example, the header part of the TNL.

Next, frame disassembler 404 removes the first header in the payload part from which the second header is removed, based on the input information from controller 405 (S202). The first header corresponds to, for example, the common header part of the eCPRI included in the payload part of the TNL.

Then, frame disassembler 404 extracts a signal (UL signal) included in the payload part (of the eCPRI) from which the first header is removed, and outputs the signal (UL signal) to secondary station signal processor 50 after frame disassembler 404 (S203).

As described above, in the first exemplary embodiment, among the signals transmitted through FH 13 (FH transmission signals), for example, the FH transmission scheme corresponding to each importance is applied for each division according to the importance. This can improve transmission quality and transmission efficiency of FH 13.

For example, by applying the FH transmission scheme that is more robust than the less important (second) division to the more important (first) division, lack of robustness and excessive redundancy in the signal can be avoided as in the case where the same FH transmission scheme is applied to the entire FH transmission signal.

Second Exemplary Embodiment

Next, the second exemplary embodiment will be described with reference to FIGS. 7, 8A, and 8B. In the second exemplary embodiment, the UL configuration corresponding to the DL configuration described in the first exemplary embodiment will be described.

FIG. 7 is a diagram showing an example of a configuration of a radio communication system according to the second exemplary embodiment. As illustrated in FIG. 7, in relation to UL communication from UE 2 to radio base station 1, radio base station 1 includes, for example, secondary station signal processor 60 and FH transmitter 70 in secondary station device 12, and includes, for example, FH receiver 80 and master station signal processor 90 in master station device 11.

FIG. 8A shows an example of the configuration of secondary station device 12 focusing on the UL (secondary station signal processor 60 and FH transmitter 70). FIG. 8B shows an example of the configuration of master station device 11 focusing on the UL (FH receiver 80 and master station signal processor 90).

<Secondary Station Device 12>

First, an example of the configuration of secondary station signal processor 60 and FH transmitter 70 in secondary station device 12 will be described with reference to FIG. 8A. Noted that two or more secondary station devices 12 can be connected to one master station device 11 and one secondary station device 12 can be connected to two or more UEs 2 as in the first exemplary embodiment.

(Secondary Station Signal Processor 60)

As illustrated in FIG. 8A, secondary station signal processor 60 includes, for example, RF unit 601, analog to digital (A/D) converter 602, CP removal+first Fourier transform (FFT) unit 603, and beamforming unit 604.

RF unit 601 has an antenna, for example, receives a radio signal of the UL transmitted from UE 2 by the antenna, and performs reception RF processing such as down-conversion processing and low noise amplification processing on the received radio signal.

A/D converter 602 converts, for example, an output (analog signal) of RF unit 601 into a digital signal.

CP removal+FFT unit 603 and beamforming unit 604 form, for example, lower physical layer (Low-PHY) block 6001.

CP removal+FFT unit 603 performs FFT and CP removal on an output of A/D converter 602, for example.

Beamforming unit 604 performs reception beam forming processing on an output of CP removal+FFT unit 603, for example. Beamforming unit 604 may be omitted when beamforming is not performed in secondary station device 12.

(FH Transmitter 70)

Meanwhile, as illustrated in FIG. 8A, FH transmitter 70 includes, for example, frame assembler 701, encoder 702, modulator 703, multiplexer (Mux) 704, and electrooptical (E/O) converter 705, and controller 706.

Functional units 701 to 706 of FH transmitter 70 for the UL may be regarded as equivalent to functional units 301 to 306 (see FIG. 4A) of FH transmitter 30 for the DL, respectively.

For example, an output signal of secondary station signal processor 60 is input to frame assembler 701. For example, frame assembler 701 generates a signal having a predetermined frame (or packet) structure from the output signal of secondary station signal processor 60, and outputs the signal to encoder 702. The operation example of frame assembler 701 may be regarded as corresponding to the example in which the DL signal is read as the UL signal in the example shown in FIG. 6A.

For example, controller 706 determines different FH transmission schemes for division 1 and division 2, and outputs the information on the determined FH transmission schemes (FH transmission control information) to encoder 702 and modulator 703.

For example, encoder 702 executes a first encoding process for division 1 based on the FH transmission control information of division 1 from controller 706, and executes a second encoding process for division 2 based on the FH transmission control information of division 2 from controller 706. For example, in the first encoding process, a lower coding rate than a coding rate in the second encoding process may be used.

For example, modulator 703 executes a first modulation process for division 1 based on the FH transmission control information of division 1 from controller 706, and executes a second modulation process for division 2 based on the FH transmission control information of division 2 from controller 706. For example, in the first modulation process, modulation with a lower modulation multilevel number than in the second modulation process may be used.

A non-limiting example of FH transmission control information (for example, transmission parameter) for the UL may be equivalent to the information illustrated in FIG. 5. For example, controller 706 may determine the FH transmission schemes (for example, an index value in FIG. 5) to be applied to divisions 1 and 2 based on the FH transmission control information, and output the determined information to encoder 702 and modulator 703 as an example of the FH transmission control information.

Controller 706 for the UL may be common to controller 306 for the DL.

Multiplexer 704, for example, multiplexes an output of modulator 703 (for example, the signals corresponding to division 1 and division 2) and the information on the FH transmission schemes of division 1 and division 2 output from controller 706, to output to E/O converter 705.

For example, E/O converter 705 electrooptically converts the output of multiplexer 704 and transmits an optical signal obtained by the conversion to FH 13. Note that the signal for each division (UL signal) may be multiplexed by any of the TDM, FDM, CDM, or WDM, similarly to the DL.

Frame assembler 701, encoder 702, modulator 703, multiplexer 704, and E/O converter 705 form a non-limiting example of a transmitter that transmits the signal (UL signal) to FH 13.

The FH transmission control information of division 1 and division 2 is not multiplexed with the output of modulator 703, for example, and may be notified to master station device 11 (for example, controller 805 of FH receiver 80 described later in FIG. 8B). For example, a channel for communication between controller 706 and controller 805 may be individually set in FH 13, or may be set in a communication path different from FH 13.

Further, a function of controller 706 only has to be provided in secondary station device 12, and may be provided in a functional block different from FH transmitter 70 in secondary station device 12. Controller 706 may be common to controller 405 for the DL.

<Master Station Device 11>

Next, an example of the configuration of FH receiver 80 and master station signal processor 90 in master station device 11 will be described with reference to FIG. 8B.

(FH Receiver 80)

As illustrated in FIG. 8B, FH receiver 80 includes, for example, O/E converter 801, demodulator 802, decoder 803, frame disassembler 804, and controller 805.

Functional units 801 to 805 of FH receiver 80 for the UL may be regarded as equivalent to functional units 401 to 405 (see FIG. 4B) of FH receiver 40 for the DL, respectively.

For example, O/E converter 801 receives the optical signal transmitted through FH 13 and converts the optical signal into an electric signal. Further, O/E converter 801 separates from the electric signal, for example, a frame signal and FH transmission control information multiplexed with the frame signal. The frame signal is output to, for example, demodulator 802, and the FH transmission control information is output to, for example, controller 805.

Controller 805 identifies divisions 1 and 2 in the frame signal (frame structure) to be demodulated and decoded, for example, based on the FH transmission control information. Further, controller 805 outputs information indicating identified divisions 1 and 2 to demodulator 802, decoder 803, and frame disassembler 804, and outputs the transmission parameters corresponding to divisions 1 and 2 to demodulator 802 and decoder 803.

For example, demodulator 802 demodulates the signals corresponding to divisions 1 and 2 based on the information input from controller 805, and outputs the signals to decoder 803.

For example, decoder 803 decodes the signals corresponding to divisions 1 and 2 based on the information input from controller 805, and outputs the signals to frame disassembler 804.

Frame disassembler 804 performs header processing such as detecting and removing (decapsulating) the header part of the frame signal which is a decoded signal from decoder 803, for example. The operation example of frame disassembler 804 may be regarded as corresponding to the example in which the DL signal is read as the UL signal in the example shown in FIG. 6B.

O/E converter 801, demodulator 802, decoder 803, and frame disassembler 804 form a non-limiting example of a receiver that receives the signal (UL signal) from FH 13.

Further, a function of controller 805 only has to be provided in master station device 11, and may be provided in a functional block different from FH receiver 80 in master station device 11. Controller 805 may be common to controller 306 for the DL (see FIG. 4A).

(Master Station Signal Processor 90)

Meanwhile, master station signal processor 90 includes RE demapping unit 901, layer demapping unit 902, demodulator 903, descrambling unit 904, and decoder 905, as illustrated in FIG. 8B, for example. These functional units 901 to 905 form, for example, higher physical layer (High-PHY) block 9001.

Further, master station signal processor 90 includes, for example, MAC unit 906, RLC unit 907, PDCP unit 908, and SDAP unit 909.

RE demapping unit 901 demaps the UL signal mapped to the radio resource (for example, RE).

Layer demapping unit 902 demaps the UL signal mapped for each layer in an output of RE demapping unit 901, for example. Layer demapping unit 902, which is used for the MIMO transmission, may be omitted when the MIMO transmission is not applied.

Demodulator 903 demodulates an output of layer demapping unit 902 by a demodulation scheme corresponding to a modulation scheme such as QPSK, 16QAM, 64QAM, or 256QAM.

Descrambling unit 904 performs descrambling processing for descrambling an output of demodulator 903, for example. Decoder 905 decodes, for example, an output of descrambling unit 904.

For example, MAC unit 906 generates an RLC PDU from the MAC PDU of the UL signal and outputs the RLC PDU to RLC unit 907.

RLC unit 907 performs processing such as error detection and retransmission control by the ARQ on the output of MAC unit 906, and outputs the PDCP PDU.

PDCP unit 908 performs processing such as decoding of encrypted user data and header decompression on the output of RLC unit 907, and outputs the SDAP PDU to SDAP unit 909.

For example, SDAP unit 909 maps the QoS flow and the radio bearer, removes the SDAP header from the output of PDCP unit 908, and transmits the output to the higher-level core network.

As described above, in the second exemplary embodiment, an effect in the UL equivalent to the effect of the first exemplary embodiment can be obtained. For example, among the signals transmitted from secondary station device 12 toward master station device 11 through FH 13 (FH transmission signals including the UL signal), for example, the FH transmission scheme corresponding to each importance is applied for each division according to the importance. This can improve transmission quality and transmission efficiency of the UL of FH 13.

For example, by applying the FH transmission scheme that is more robust than the less important (second) division to the more important (first) division, lack of robustness and excessive redundancy in the signal can be avoided as in the case where the same FH transmission scheme is applied to the entire FH transmission signal.

Third Exemplary Embodiment

Next, a third exemplary embodiment will be described with reference to FIGS. 9A and 9B. In the third exemplary embodiment, the functional split configuration (or functional split point) between master station device 11 and secondary station device 12 is different from that in the first exemplary embodiment. A system configuration example may be the same as in FIG. 3. Further, two or more secondary station devices 12 can be connected to one master station device 11 and one secondary station device 12 can be connected to two or more UEs 2 as in the first exemplary embodiment.

Figure 9A:
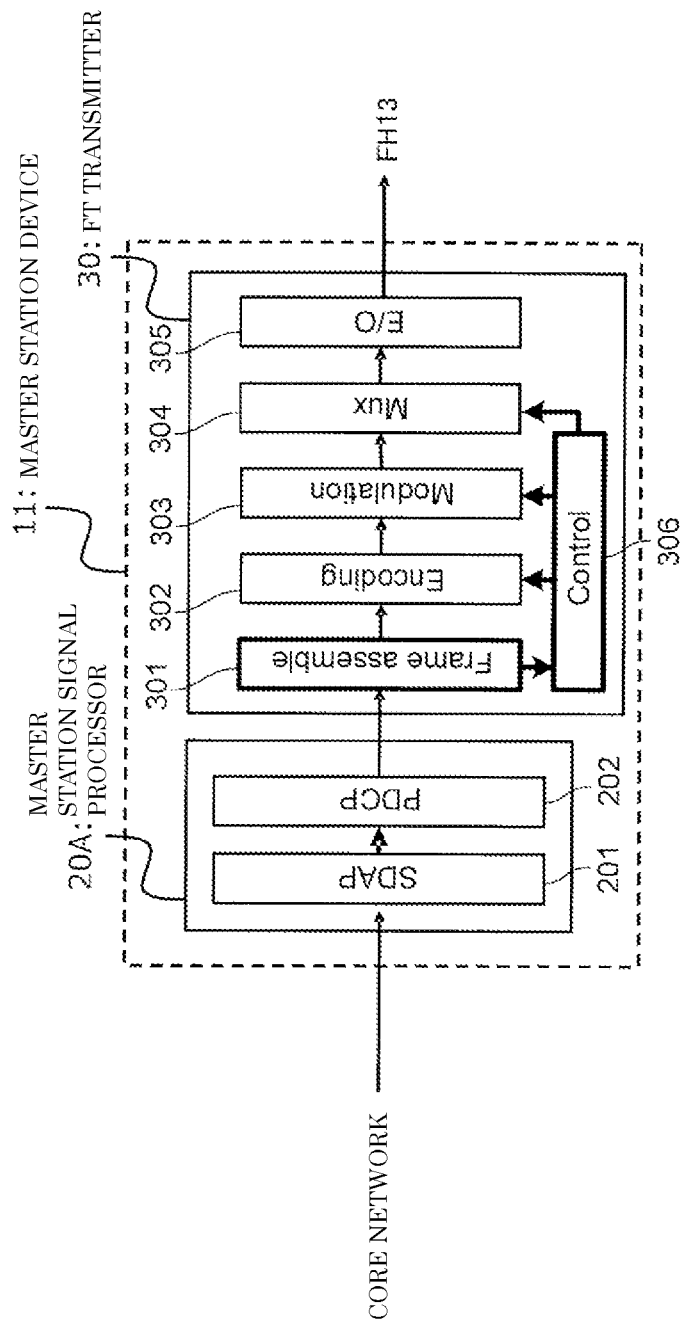
FIG. 9A is a block diagram showing an example of a configuration (DL) of a master station device according to a third exemplary embodiment.

In the third exemplary embodiment, master station device 11 (master station signal processor 20A) is provided with SDAP unit 201 and PDCP unit 202 as illustrated in FIG. 9A.

Figure 9B:
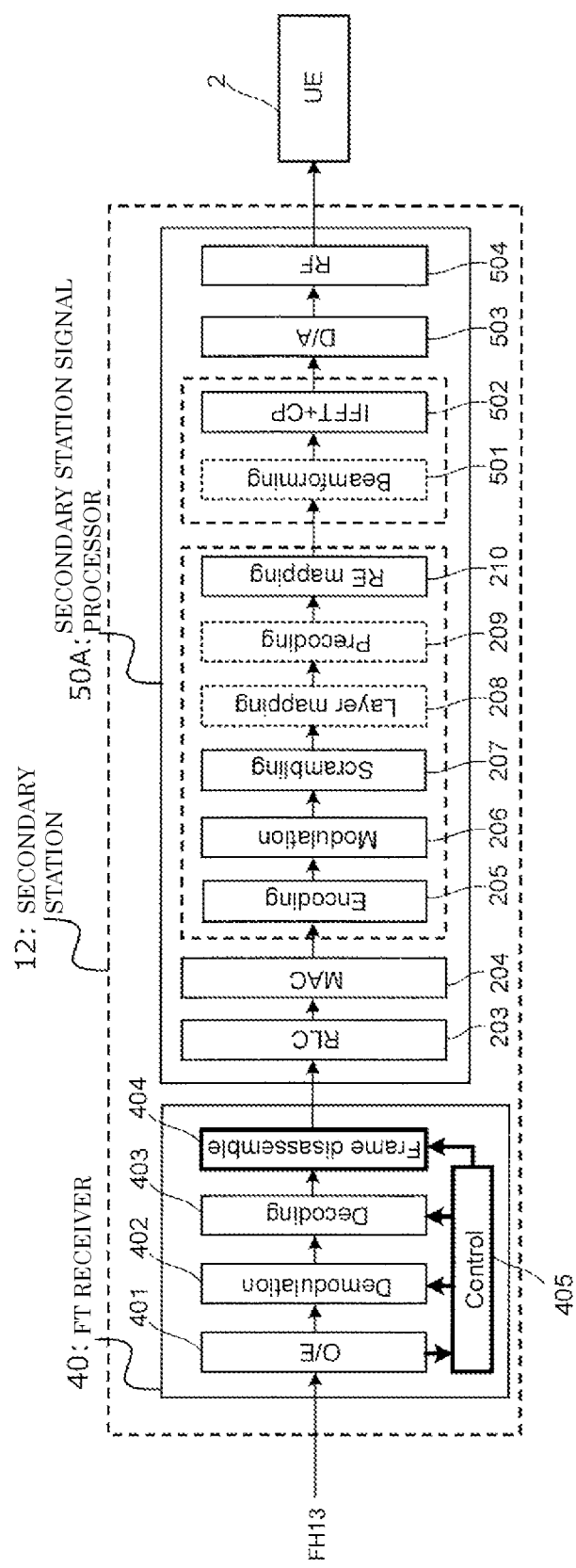
FIG. 9B is a block diagram showing an example of a configuration (DL) of a secondary station device according to the third exemplary embodiment.

RLC unit 203, MAC unit 204, High-PHY block 2001 (encoder 205, scrambling unit 206, modulator 207, layer mapping unit 208, precoder 209, and RE mapping unit 210) illustrated in FIG. 4A are provided in secondary station device 12 (secondary station signal processor 50A), for example, as shown in FIG. 9B.

Thus, in the third exemplary embodiment, secondary station signal processor 50A includes functional units 203 to 210 described above in addition to beamforming unit 501, IFFT+CP unit 502, D/A converter 503, and RF unit 504 illustrated in FIG. 4B. An example of the operations of functional units 203 to 210 provided in secondary station device 12 may be the same as the example of the operations described for master station device 11 in the first exemplary embodiment.

Further, an example of the configuration and operation of FH transmitter 30 in master station device 11 and FH receiver 40 in secondary station device 12 may be the same as the example of the configuration and operation described in the first exemplary embodiment. Further, an example of the operation of frame assembler 301 in FH transmitter 30 may be the same as the example of the operation described in FIG. 6A, and an example of the operation of frame disassembler 404 in FH receiver 40 may be the same as the example of the operation described in FIG. 6B.

In the third exemplary embodiment, the following effect can be obtained in addition to an effect equivalent to the effect of the first exemplary embodiment.

For example, the number of functions disposed in secondary station device 12 is larger than that in master station device 11 as compared with the first exemplary embodiment (see FIGS. 4A and 4B). Here, in radio base station 1, the header and redundancy of the signal tend to increase as the processing proceeds closer to the transmission, and thus a data volume tends to be large.

Therefore, as in the third exemplary embodiment, by providing more functional units in secondary station device 12 than in master station device 11, the traffic volume from master station device 11 to secondary station device 12, that is, the traffic volume of FH 13 can be reduced.

Meanwhile, when MAC unit 204, encoder 205, scrambling unit 206, and modulator 207 are included in master station device 11 (master station signal processor 20) as in the first exemplary embodiment, the signal transmitted in the radio section in master station device 11 is encoded and modulated.

Thus, the error tolerance of the payload part in the FH transmission section can be improved in the first exemplary embodiment. The redundancy of the encoding for the payload part (for example, the encoding by encoder 302 of FH transmitter 30) can be therefore reduced.

However, the number of functions disposed in master station device 11 is larger than that in secondary station device 12 in the first exemplary embodiment. Thus, a size of the signal (for example, the payload part) transmitted to the DL through FH 13 tends to be larger than in the third exemplary embodiment. Conversely, in the third exemplary embodiment, it is more difficult to improve the error tolerance in FH 13 than in the first exemplary embodiment, but the traffic volume of the DL in FH 13 can be reduced.

In this way, the improvement of the error tolerance and the reduction of the traffic volume in FH 13 are in a trade-off relationship with each other, and thus based on this relationship, the functional split configuration of master station device 11 and secondary station device 12 in radio base station 1 may be selected and determined.

At this time, it may be determined whether to divide the signal structure of FH transmission described in the first and second exemplary embodiments into the plurality of divisions and apply different FH communication schemes for the divisions in accordance with the determined functional split configuration. For example, upon determination that the error tolerance in FH 13 is not sufficient in accordance with the functional split configuration of the third exemplary embodiment, an increase in the traffic volume can be suppressed and robust communication can be achieved by applying a more resistant FH communication scheme to division 1.

Further, for example, MAC unit 204 determines and controls a transmission scheme in the radio section (radio transmission scheme) in accordance with channel quality information (for example, channel quality indicator, CQI) fed back from UE 2. Further, MAC unit 204 performs retransmission control called HARQ, for example, in accordance with acknowledgment (Ack/Nack) information fed back from UE 2.

MAC unit 204 responsible for such control and disposed in master station device 11 (master station signal processor 20) as in the first exemplary embodiment, for example, allows for a coordinated operation between a plurality of different secondary station devices 12 connected to master station device 11.

This can improve a signal-to-interference plus noise power ratio (SINR) in the radio section. Communication by such a coordinated operation is called coordinated multiple-point (CoMP) communication or antenna coordination.

On the other hand, MAC unit 204 disposed in secondary station device 12 (secondary station signal processor 50A) as in the third exemplary embodiment, for example, allows for the retransmission control of the HARQ not through FH 13. This can shorten round trip time (RTT) by round trip time of the FH and reduce a delay.

In this way, system performance can differ depending on the difference in the functional split configuration between master station device 11 and secondary station device 12. Based on such a difference in the system performance, the functional split configuration of master station device 11 and secondary station device 12 in radio base station 1 may be selected and determined.

Fourth Exemplary Embodiment

Next, a fourth exemplary embodiment will be described with reference to FIGS. 10A and 10B. In the fourth exemplary embodiment, the UL configuration corresponding to the DL configuration described in the third exemplary embodiment (functional split configuration different from the first exemplary embodiment) will be described.

In other words, in the fourth exemplary embodiment, the functional split configuration between master station device 11 and secondary station device 12 is different from that in the second exemplary embodiment regarding the UL, similarly to a relationship between the first exemplary embodiment and the third exemplary embodiment.

The system configuration example in the fourth exemplary embodiment may be the same as the configuration example shown in FIG. 7 of the second exemplary embodiment. Further, two or more secondary station devices 12 can be connected to one master station device 11, and one secondary station device 12 can be connected to two or more UEs 2, similarly to the first exemplary embodiment.

Figure 10A:
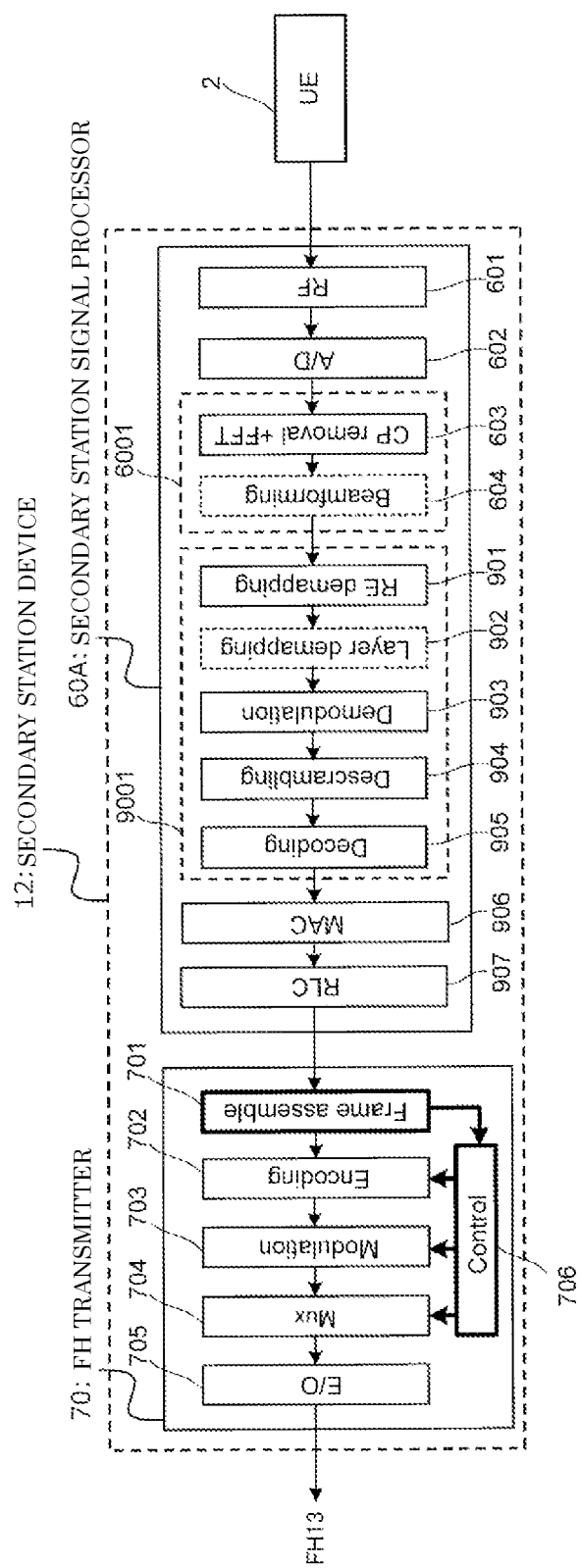
FIG. 10A is a block diagram showing an example of a configuration (UL) of a secondary station device according to a fourth exemplary embodiment.

As illustrated in FIG. 10A, secondary station signal processor 60A of secondary station device 12 includes RF unit 601, A/D converter 602, CP removal+FFT unit 603, beamforming unit 604, High-PHY block 9001, MAC unit 906, and RLC unit 907. High-PHY block 9001 includes, for example, RE demapping unit 901, layer demapping unit 902, demodulator 903, descrambling unit 904, and decoder 905. Layer demapping unit 902 may be omitted when the MIMO transmission is not applied.

High-PHY block 9001 (functional units 901 to 905), MAC unit 906, and RLC unit 907 correspond to, for example, elements provided in master station device 11 (master station signal processor 90) in the second exemplary embodiment (see FIG. 8B).

Figure 10B:
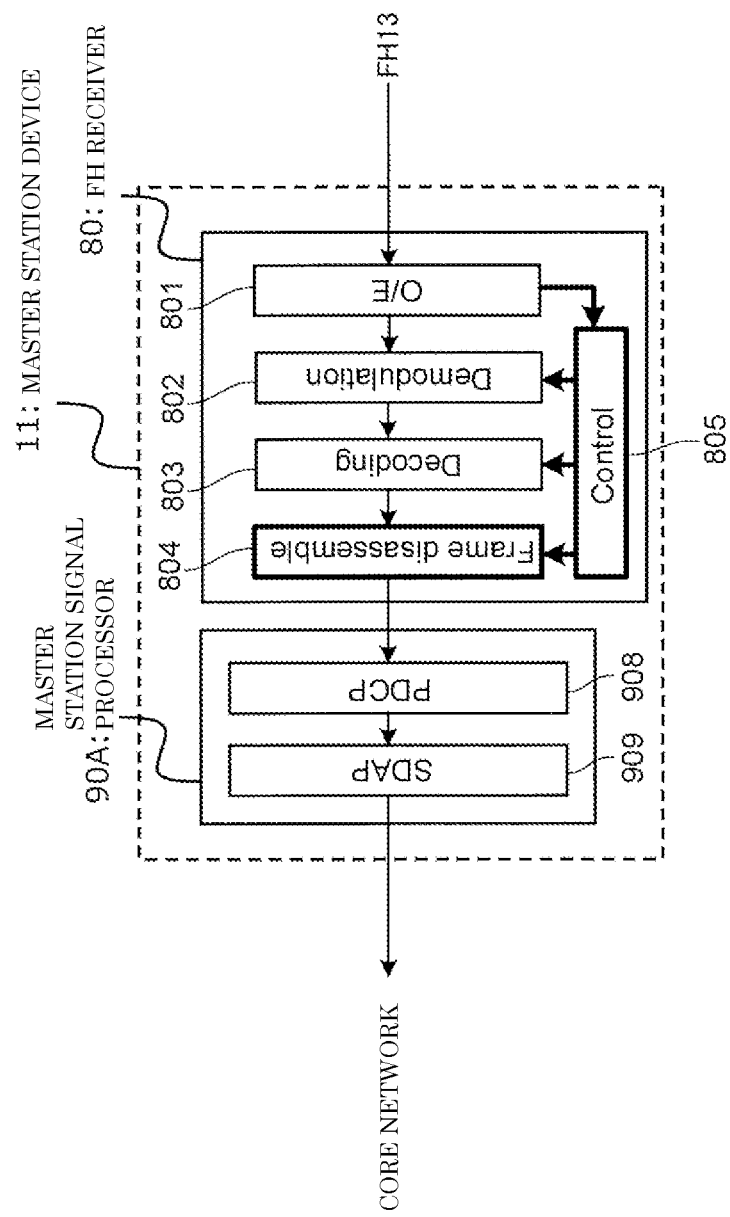
FIG. 10B is a block diagram showing an example of a configuration (UL) of a master station device according to the fourth exemplary embodiment.

As described above, High-PHY block 9001, MAC unit 906, and the RLC unit 907 are provided in secondary station device 12, and in master station device 11, PDCP unit 908 and SDAP unit 909 are provided in master station signal processor 90A as illustrated in FIG. 10B.

An example of the operations of functional units 901 to 905 provided in secondary station device 12 may be the same as the example of the operations described for master station device 11 in the second exemplary embodiment.

Further, an example of the configuration and operation of FH transmitter 70 in secondary station device 12 and FH receiver 80 in master station device 11 may be the same as the example of the configuration and operation described in the second exemplary embodiment (FIGS. 8A and 8B).

Further, an example of the operation of frame assembler 701 in FH transmitter 70 may be regarded as corresponding to the example in which the DL signal is read as the UL signal in the example shown in FIG. 6A. An example of the operation of frame disassembler 804 in FH receiver 80 may be regarded as corresponding to the example in which the DL signal is read as the UL signal in the example shown in FIG. 6B.

In the fourth exemplary embodiment, the following effect for the UL can be obtained in addition to an effect equivalent to the effect of the first exemplary embodiment.

For example, in the fourth exemplary embodiment, as in the third exemplary embodiment regarding the DL, the functional split configuration of radio base station 1 may be selected and determined based on the trade-off relationship between the improvement of the error tolerance in FH 13 and the reduction of the traffic volume, and the difference in the system performance according to the difference in the functional split configurations.

For example, in the fourth exemplary embodiment, as illustrated in FIGS. 10A and 10B, the number of functions disposed in secondary station device 12 is larger than that in master station device 11. Here, in radio base station 1, the header and redundancy of the signal tend to decrease as reception processing of the UL progresses, and thus the data volume tends to be small.

Therefore, as in the fourth exemplary embodiment, by providing more functional units in secondary station device 12 than in master station device 11, the traffic volume from secondary station device 12 to master station device 11, that is, the traffic volume of the UL in FH 13 can be reduced.

Meanwhile, when demodulator 903, descrambling unit 904, decoder 905, and MAC unit 906 are included in master station device 11 (master station signal processor 90) as in the second exemplary embodiment (FIG. 8B), the payload part of the FH transmission signal is received by master station device 11 with the error tolerance enhanced by the encoding and modulation in secondary station device 12.

Thus, the error tolerance of the payload part of the UL in the FH transmission section can be improved in the second exemplary embodiment. The redundancy of the encoding for the payload part (for example, the encoding by encoder 702 of FH transmitter 70) can be reduced in secondary station device 12.

Further, MAC unit 906 disposed in secondary station device 12 (secondary station signal processor 60A) as in the fourth exemplary embodiment, for example, allows for the retransmission control of the HARQ not through FH 13. This can shorten the RTT by the round trip time of the FH and reduce the delay.

On the other hand, MAC unit 906 disposed in master station device 11 (master station signal processor 90) as in the second exemplary embodiment allows for a coordinated operation (for example, CoMP) between a plurality of different secondary station devices 12 connected to master station device 11. This can improve the SINR in a radio communication section of the UL.

Others

In the first to fourth exemplary embodiments, a structure conforming to standards such as Ethernet II, IEEE 802.2, and IEEE 802.3 is applicable to the signal (frame) structure of the FH transmission signal as a non-limiting example.

Further, in the first to fourth exemplary embodiments, in master station device 11, master station signal processor 20 (or 20A) of the DL and master station signal processor 90 (or 90A) of the UL may be configured as physically different devices or may be provided in the physically same device.

Similarly, in master station device 11, FH transmitter 30 of the DL and FH receiver 80 of the UL may be configured as physically different devices or may be provided in the physically same device. Further, FH transmitter 30 and FH receiver 80 may be integrated as, for example, an FH transmission and reception device or an FH communication device shared by the DL and the UL.

Similarly, in secondary station device 12, FH receiver 40 of the DL and FH transmitter 70 of the UL may be configured as physically different devices or may be provided in the physically same device. Further, FH receiver 40 and FH transmitter 70 may be integrated as, for example, an FH transmission and reception device or an FH communication device shared by the DL and the UL.

Further, secondary station signal processor 50 (or 50A) of the DL and secondary station signal processor 60 (or 60A) of the UL may be configured as physically different devices, or may be provided in the physically same device.

Further, in master station device 11, at least one of master station signal processor 20 (or 20A) of the DL or master station signal processor 90 (or 90A) of the UL may include logical slices.

Similarly, in secondary station device 12, at least one of secondary station signal processor 50 (or 50A) of the DL or secondary station signal processor 60 (or 60A) of the UL may include logical slices.

At least one of master station device 11 and secondary station device 12 may include logical slices.

In the first to fourth exemplary embodiments, the description has been made focusing a one-to-one connection relationship between master station device 11 and secondary station device 12. However, the connection relationship between master station device 11 and secondary station device 12 may be a one-to-many relationship.

The notation "unit" used in the first to fourth exemplary embodiments may be replaced with another notation such as "circuit (circuitry)", "device", "part", or "module" when the notation means a physical element. On the other hand, when the notation means a logical element, the notation "unit" may be replaced with, for example, "slice" as described above.

The term "functional split point" may be referred to as "split", "option", or "split option".

For example, the Common Public Radio Interface: eCPRI Interface Specification V2.0 (2019-05-10) specifies splits A to E. Further, examples of a "split option" include split options 1 to 8 described below as described in ITU-T G-series Recommendations—Supplement 66 (2018-10).

(1) Split option 1: Between radio resource control (RRC) and PDCP
(2) Split option 2: Between PDCP and RLC (High-RLC)
(3) Split option 3: Between High-RLC and Low-RLC
(4) Split option 4: Between RLC (Low-RLC) and MAC (High-MAC)
(5) Split option 5: Between High-MAC and Low-MAC
(6) Split option 6: Between MAC (Low-MAC) and PHY (High-PHY)
(7) Split option 7: Between High-PHY and Low-PHY
(8) Split option 8: Between PHY (Low-PHY) and RF As shown in the above split options 1 to 8, the RLC units and the MAC units may be functionally split (or classified) into high and low in the first to fourth exemplary embodiments. In other words, any one of splits A to E (or split options 1 to 8) may be further split (or classified) as, for example, a "sub-split" (or "sub-option").

In the first to fourth exemplary embodiments, as the functional split configuration of master station device 11 (master station signal processor 20 or 90) and secondary station device 12 (secondary station signal processor 50 or 60), any of splits A to E (or split options 1 to 8) may be adopted.

Further, in the first to fourth exemplary embodiments, a plurality of functional split configurations having different functional split points may be applied to master station device 11 and secondary station device 12.

For example, in the DL, master station signal processor 20 (see FIG. 4A) in the first exemplary embodiment and master station signal processor 20A (see FIG. 9A) in the third exemplary embodiment may be provided in one master station device 11. Further, in the DL, secondary station signal processor 50 (see FIG. 4B) in the first exemplary embodiment and secondary station signal processor 50A (see FIG. 9B) in the third exemplary embodiment may be provided in one master station device 11.

Similarly, in the UL, secondary station signal processor 60 (see FIG. 8A) in the second exemplary embodiment and secondary station signal processor 60A (FIG. 10A) in the fourth exemplary embodiment may be provided in one secondary station device 12. Further, in the UL, master station signal processor 90 (see FIG. 8B) in the second exemplary embodiment and master station signal processor 90A (FIG. 10B) in the fourth exemplary embodiment may be provided in one master station device 11.

As the plurality of types of functional split configurations, for example, any combination of different splits (or split options) may be adopted. The above "sub-split" (or "sub-option") may be included in combination candidates of different functional split configurations. Further, the plurality of types of functional split configurations may be realized by omitting (or skipping) the processing of some functional units in one functional split configuration.

In the first to fourth exemplary embodiments, a case with one functional split point (in other words, two functional split configurations including master station device 11 and secondary station device 12) has been described, but there may be two or more functional split points. For example, the plurality of base station functional units may be split and disposed in three unit, which are CU, DU, and radio unit (RU), by two functional split points.

A transmission scheme suitable for each division may be applied to at least one transmission signal between the CU and the DU or between the DU and the RU.

The present disclosure can be realized by software, hardware, or software linked with hardware.

The functional blocks used for describing the exemplary embodiments are partially or wholly realized as a large-scale integration (LSI) as an integrated circuit. Each process described in the exemplary embodiments may be partially or wholly controlled by one LSI or a combination of LSIs. The LSI may be configured by individual chips, or may be configured by one chip so as to include some or all of the functional blocks. The LSI may include data input and output. The LSI may be referred to as an IC, a system LSI, a super LSI, or an ultra LSI depending on an integration degree.

A method of circuit integration is not limited to the LSI, and may be realized by a dedicated circuit, a general-purpose processor, or a dedicated processor. A field programmable gate array (FPGA) that can be programmed after the LSI is manufactured, or a reconfigurable processor that can reconfigure connection and setting of circuit cells inside the LSI may be used. The present disclosure may be implemented as digital processing or analog processing.

Further, if integrated circuit technology emerges to replace LSIs as a result of advancement of semiconductor technology or another derivative technology, the functional blocks may well be integrated using such a technology. An application of biotechnology or the like is possible.

SUMMARY OF THE PRESENT DISCLOSURE

A transmission device according to a non-limiting example of the present disclosure includes a controller configured to control a transmission scheme for each of a plurality of divisions corresponding to signals which are divided and are to be transmitted to a fronthaul, and a transmitter configured to transmit the signals to the fronthaul.

In the transmission device according to a non-limiting example of the present disclosure, the plurality of divisions may include a first division and a second division, the first division may include at least one of header information or control information, and the second division may include payload information subjected to signal processing for transmission in a radio section between a radio device and a terminal device connected through the fronthaul.

In the transmission device according to a non-limiting example of the present disclosure, the header information included in the first division may be header information for a transmission section of the fronthaul.

In the transmission device according to a non-limiting example of the present disclosure, the header information included in the first division may include header information for the radio section and header information for a transmission section of the fronthaul.

In the transmission device according to a non-limiting example of the present disclosure, the plurality of divisions may include a first division and a second division, the controller may be configured to apply a transmission scheme having higher error tolerance to the first division than to the second division.

In the transmission device according to a non-limiting example of the present disclosure, the plurality of divisions may include a first division and a second division, the transmitter may be configured to multiplex information indicating the first division and the second division and information indicating the transmission scheme applied to the first division and the second division on the signals.

In the transmission device according to a non-limiting example of the present disclosure, the transmission scheme may be defined by any one or a combination of two or more of an error correction code, a coding rate, a modulation multilevel number, or an optical multiplex wavelength.

A reception device according to a non-limiting example of the present disclosure includes a receiver configured to receive signals from a fronthaul, and a controller configured to control restoration processing for each of a plurality of divisions in accordance with a transmission scheme controlled for each of the plurality of divisions, the plurality of divisions corresponding to the signals which are divided.

In the reception device according to a non-limiting example of the present disclosure, the plurality of divisions may include a first division and a second division, the first division may include at least one of header information or control information, and the second division may include payload information on radio signal processing.

In the reception device according to a non-limiting example of the present disclosure, the header information included in the first division may be header information for a transmission section of the fronthaul.

In the reception device according to a non-limiting example of the present disclosure, the header information included in the first division may include header information for the radio section between a radio device including the reception device and a terminal device and header information for a transmission section of the fronthaul.

In the reception device according to a non-limiting example of the present disclosure, the plurality of divisions may include a first division and a second division, a transmission scheme applied to the first division may be a transmission scheme with higher error tolerance than a transmission scheme applied to the second division.

In the reception device according to a non-limiting example of the present disclosure, the plurality of divisions may include a first division and a second division, the receiver may be configured to receive information indicating the first division and the second division and information indicating the transmission scheme, the information being multiplexed with the signals.

In the reception device according to a non-limiting example of the present disclosure, the transmission scheme may be defined by any one or a combination of two or more of an error correction code, a coding rate, a modulation multilevel number, or an optical multiplex wavelength.

A method of communication according to a non-limiting example of the present disclosure includes controlling a transmission scheme for each of a plurality of divisions corresponding to signals which are divided and are to be transmitted to a fronthaul, and transmitting the signals to the fronthaul.

A method of communication according to a non-limiting example of the present disclosure includes receiving signals from a fronthaul, and controlling restoration processing for each of a plurality of divisions in accordance with a transmission scheme controlled for each of the plurality of divisions, the plurality of divisions corresponding to the signals which are divided.

The present disclosure is suitable for, for example, a base station for radio communication.

What is claimed is:

1. A transmission device comprising:
   a controller configured to apply transmission schemes to respective divisions of a frame structure of a signal to be transmitted to a reception device through a fronthaul; and
   a transmitter configured to transmit the signal to the reception device through the fronthaul, wherein
   the respective divisions include a first division and a second division,
   the controller is configured to apply a transmission scheme having a higher error tolerance to the first division and a transmission scheme having a lower error tolerance to the second division,
   the controller is configured to apply the transmission scheme having the higher error tolerance by reducing a modulation multilevel number, reducing a coding rate or increasing transmission redundancy,
   the first division includes at least one of header information or control information, and the second division includes payload information subjected to signal processing for transmission in a radio section between a radio device and a terminal device connected through the fronthaul.

2. The transmission device according to claim 1, wherein the header information included in the first division is header information for a transmission section of the fronthaul.

3. The transmission device according to claim 1, wherein the header information included in the first division includes header information for the radio section and header information for a transmission section of the fronthaul.

4. The transmission device according to claim 1, wherein the transmitter is configured to multiplex information indicating the first division and the second division and information indicating the transmission schemes applied to the first division and the second division on the signal.

5. The transmission device according to claim 1, wherein the transmission schemes are defined by any one or a combination of two or more of an error correction code, the coding rate, the modulation multilevel number, or an optical multiplex wavelength.

6. A reception device comprising:
a receiver configured to receive a signal from a transmission device through a fronthaul; and
a controller configured to restore the signal in accordance with transmission schemes for respective divisions of a frame structure of the signal, wherein
the respective divisions include a first division and a second division,
a transmission scheme applied to the first division has a higher error tolerance and a transmission scheme applied to the second division has a lower error tolerance,
the transmission scheme is applied to the first division to have the higher error tolerance by reducing a modulation multilevel number, reducing a coding rate or increasing transmission redundancy,
the first division includes at least one of header information or control information, and
the second division includes payload information on radio signal processing.

7. The reception device according to claim 6, wherein the header information included in the first division is header information for a transmission section of the fronthaul.

8. The reception device according to claim 6, wherein the header information included in the first division includes header information for a radio section between a radio device including the reception device and a terminal device and header information for a transmission section of the fronthaul.

9. The reception device according to claim 6, wherein the receiver is configured to receive information indicating the first division and the second division and information indicating the transmission scheme, the information being multiplexed with the signal.

10. The reception device according to claim 6, wherein the transmission schemes are defined by any one or a combination of two or more of an error correction code, the coding rate, the modulation multilevel number, or an optical multiplex wavelength.

11. A method of communication comprising:
applying transmission schemes for respective divisions of a frame structure of a signal to be transmitted to a reception device through a fronthaul; and
transmitting the signal to the reception device through the fronthaul, wherein
the respective divisions include a first division and a second division,
a transmission scheme applied to the first division has a higher error tolerance and a transmission scheme applied to the second division has a lower error tolerance,
the transmission scheme is applied to the first division to have the higher error tolerance by reducing a modulation multilevel number, reducing a coding rate or increasing transmission redundancy,
the first division includes at least one of header information or control information, and
the second division includes payload information subjected to signal processing for transmission in a radio section between a radio device and a terminal device connected through the fronthaul.

12. A method of communication comprising:
receiving a signal from a transmission device through a fronthaul; and
restoring the signal in accordance with transmission schemes for respective divisions of a frame structure of the signal, wherein
the respective divisions include a first division and a second division,
a transmission scheme applied to the first division has a higher error tolerance and a transmission scheme applied to the second division has a lower error tolerance,
the transmission scheme is applied to the first division to have the higher error tolerance by reducing a modulation multilevel number, reducing a coding rate or increasing transmission redundancy,
the first division includes at least one of header information or control information, and
the second division includes payload information on radio signal processing.

* * * * *